United States Patent

Rahnema

[11] Patent Number: 5,870,443
[45] Date of Patent: Feb. 9, 1999

[54] SYMBOL TIMING RECOVERY AND TRACKING METHOD FOR BURST-MODE DIGITAL COMMUNICATIONS

[75] Inventor: Moe Rahnema, Gaithersburg, Md.

[73] Assignee: Hughes Electronics Corporation, El Segundo, Calif.

[21] Appl. No.: 820,021

[22] Filed: Mar. 19, 1997

[51] Int. Cl.$^6$ .................................................. H04L 7/00
[52] U.S. Cl. ........................................................ 375/355
[58] Field of Search ................................. 375/355, 350, 375/329; 327/91, 291; 328/72

[56] References Cited

U.S. PATENT DOCUMENTS

| | | | |
|---|---|---|---|
| 4,599,732 | 7/1986 | LeFever | 375/355 |
| 4,866,739 | 9/1989 | Agazzi et al. | 375/355 |
| 5,170,415 | 12/1992 | Yoshida et al. | 375/355 |
| 5,513,221 | 4/1996 | Parr et al. | 375/344 |
| 5,537,419 | 7/1996 | Parr et al. | 375/355 |
| 5,566,214 | 10/1996 | Kroeger et al. | 375/355 |
| 5,724,396 | 3/1998 | Claydon et al. | 375/355 |
| 5,768,323 | 6/1998 | Kroeger et al. | 375/355 |
| 5,809,086 | 9/1998 | Ariyavisitakul | 375/355 |

*Primary Examiner*—Tesfaldet Bocure
*Attorney, Agent, or Firm*—John T. Whelan; Michael W. Sales

[57] ABSTRACT

A data symbol timing recovery technique for determining an optimum symbol timing phase for use in digital communication systems using a burst mode digital communication format. The technique uses a nonlinear operation, e.g., squaring the magnitude of a down-converted baseband demodulated data burst. The squared signal is processed through a simple one pole IIR digital filter which extracts the symbol timing phase offset. The phase offset is scaled to the time domain and used to adjust the symbol timing of the next data burst. This technique is applicable to phase modulated data such as BPSK or QPSK modulated data. The technique was simulated using $\pi/4$ QPSK modulated data and provided improved and robust performance.

13 Claims, 5 Drawing Sheets

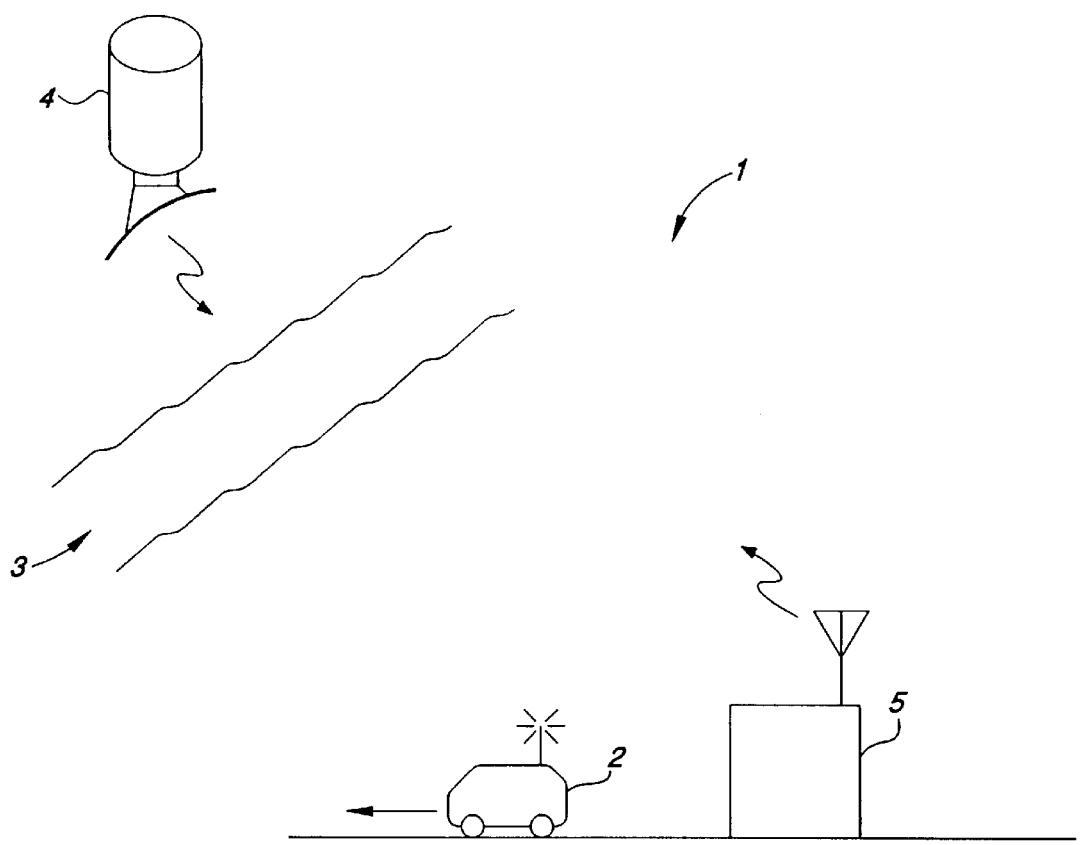
FIG. 1
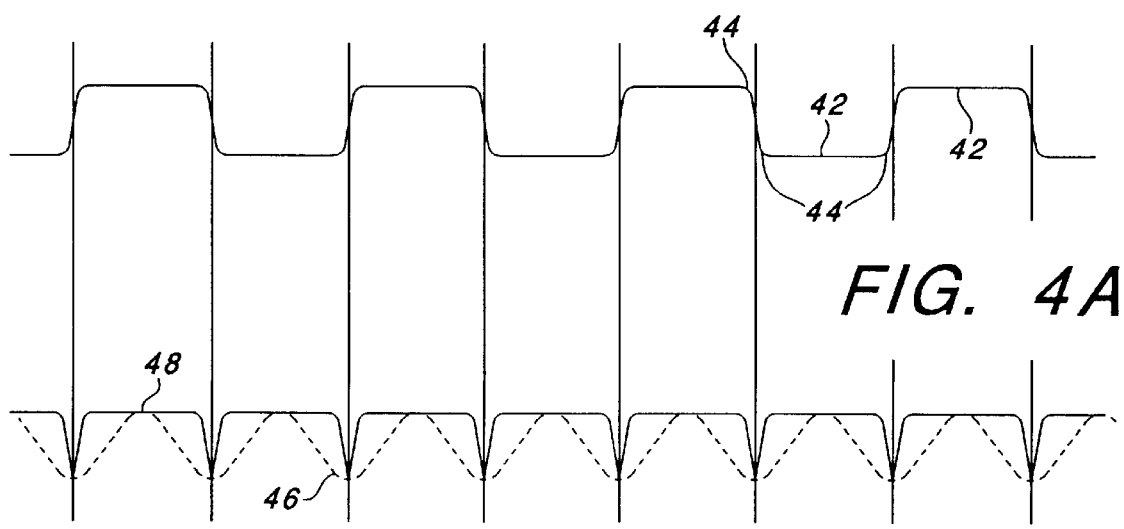
FIG. 4A
FIG. 4B

5,870,443

SYMBOL TIMING RECOVERY AND TRACKING METHOD FOR BURST-MODE DIGITAL COMMUNICATIONS

BACKGROUND OF THE INVENTION

The present invention relates to data symbol timing recovery techniques for digital communication systems using a burst mode communication format.

Existing cellular mobile communication systems are generally regional systems that require numerous antennas scattered over the system's coverage area. The cost of locating and operating the antennas over a large coverage area is expensive and, accordingly, mobile communication services are often limited to metropolitan areas or along heavily traveled highways. Mobile communication services generally are not available in rural areas and along remote highways.

Satellite-based mobile communication systems are being developed for providing service on a global basis and to remote areas. A satellite-based communication system 1, as shown in FIG. 1, is able to cover a relatively large geographical area because the satellite's antennas may be configured to cover areas as large as a continent.

Satellite-based mobile communication systems are subject to Rician channel fading. Rician channel fading results from a combination of fading due to atmospheric effects and of Rayleigh fading which is inherent in mobile communication systems. For various reasons, including those relating to Rician fading, digital methods are generally implemented in satellite-based mobile communication systems.

In a typical implementation, an audio voice signal is converted to a digital signal and transmitted from a mobile station 2 through the earth's atmosphere 3 such that a portion of the signal is captured by a receiver on a satellite 4. The satellite relays the digital signal to another mobile station 2 or to a ground-based station 5 for connection with land-based telephone lines. Because an audio voice signal has a relatively small bandwidth, several signals are often frequency or time multiplexed within a larger bandwidth of the satellite's communications channel. Time multiplexing, for example, involves sending the digital audio signals as relatively short data bursts.

The mobile station, and in some systems the satellite, must decode the digital signal after it is transmitted across the data channel. Transmission through the channel causes the digital symbols or pulses to have rounded corners due to the channel's limited bandwidth. Efficient reception of the digital signal is achieved if the digital pulses are sampled at the pulse's maximum value which is generally centered between the rounded corners.

Many valuable techniques are available for determining the timing of the symbol maxima for a modulated digital data signal. However, within the available power limitations of a satellite-based mobile communication system, these existing techniques often are not precise when recovering the symbol timing for a burst digital signal that is communicated over a channel which is subject to Rician fading and that has a relatively short burst time in comparison with the time between bursts.

Accordingly, there is exist a need for a mobile communication station that efficiently recovers the symbol timing of a burst of digital data within limited available power conditions. The present invention satisfies these needs.

SUMMARY OF THE INVENTION

This invention relates to the development of a simple, well performing technique for the recovery of the optimum symbol timing phase for use in digital communication systems using the burst mode. The technique is based on the nonlinear operation of squaring the magnitude of the down-converted baseband demodulated burst, processing through a simple one pole IIR digital filter, then extracting and scaling the phase from the output of the filter. This technique is applicable to a wide variety of phase modulated data such as BPSK or the QPSK modulated data.

BRIEF DESCRIPTION OF THE DRAWINGS

The above and other aspects, features and advantages of the present invention will be more apparent from the following more particular description thereof, presented in conjunction with the following drawings wherein:

FIG. 1 is a schematic view of a satellite-based mobile communication system.

FIG. 4A is a graph of a baseband filtered BPSK waveform having pulses with rounded corners.

FIG. 4B is a graph of the baseband waveform shown in FIG. 4A, after the waveform is operated on by a squaring operation.

Corresponding reference characters indicate corresponding components throughout the several views of the drawings.

DESCRIPTION OF THE PREFERRED EMBODIMENTS

The following description is of the best mode presently contemplated for carrying out the invention. This description is not to be taken in a limiting sense, but is made merely for the purpose of describing the general principles of the invention. The scope of the invention should be determined with reference to the claims.

Figures 2, 5:
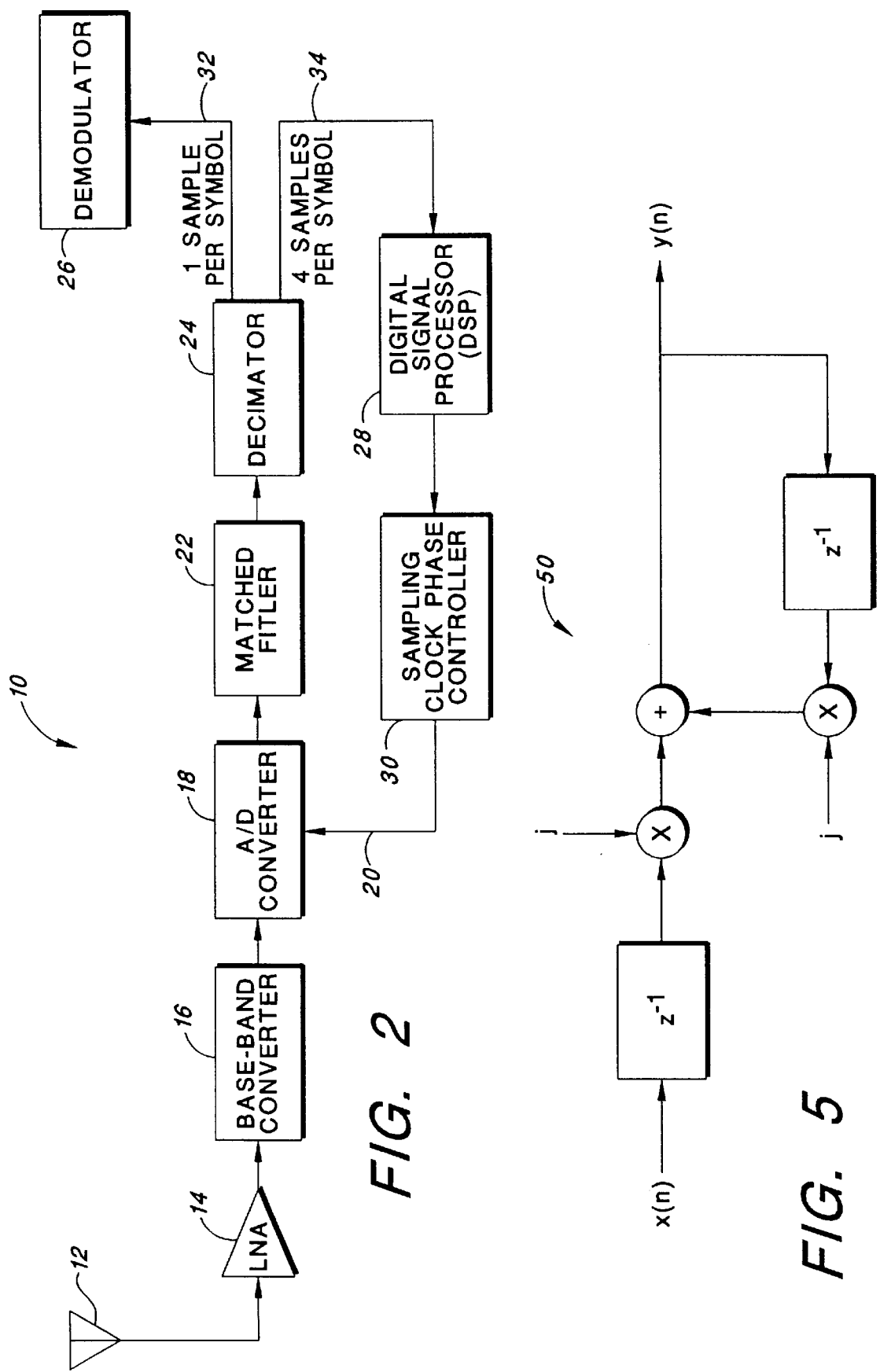
FIG. 2 is a block diagram of a digital data symbol timing recovery system for use in a communication system, in accordance with the present invention.
FIG. 5 is a flow graph of a one-pole IIR filter implemented by a digital signal processor of the timing recovery system of FIG. 2.
Figure 3:
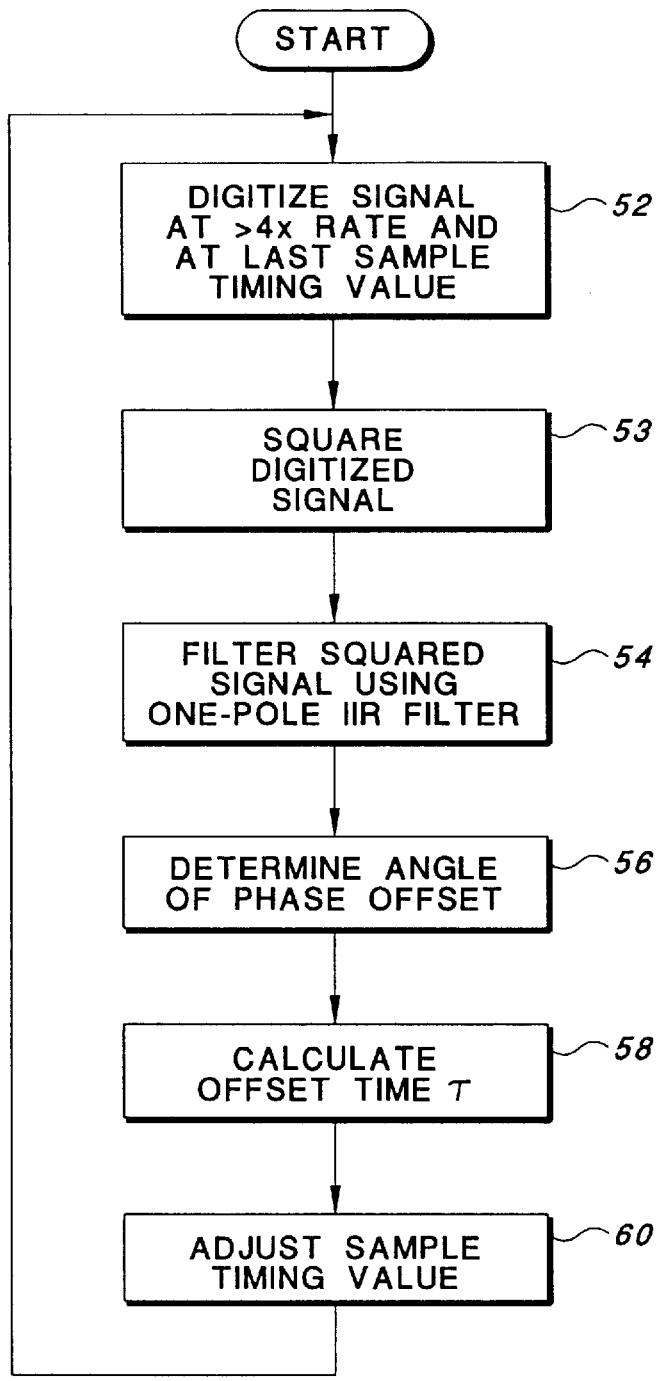
FIG. 3 is a flow chart of the process of the present invention for implementation by the timing recovery system of FIG. 2.

A shown in the exemplary drawings, and in particular to FIGS. 2 and 3, the present invention resides in a method, and related apparatus, for recovering the symbol timing of a digital data burst. The timing recovery technique of the invention uses signal processing techniques for extracting a symbol rate spectral line from a received signal on which a nonlinear operation has been performed. Once the symbol rate spectral line is extracted, its phase provides an indication of the symbol timing phase error as discussed in more detail below.

Before describing the method in detail, it would be helpful to review an apparatus, shown in FIG. 2, for implementing the symbol timing recovery technique. The apparatus 10 includes an analog section and a digital section. The analog section has an antenna 12, a low-noise amplifier (LNA) 14, a baseband converter 16, and an analog-to-digital (A/D) converter 18. The A/D converter includes a timing control input 20 for controlling the time at which the A/D converter takes samples of an incoming signal. Preferably, the sampling rate of the A/D converter is an integer multiple of four samples per symbol. The individual components of the analog section are readily available and known to one of skill in the art.

The digital section includes a matched filter 22, a decimator 24, a demodular 26, a digital signal processor (DSP) 28, and a sampling clock phase controller 30. The decimator has two outputs 32 and 34. The first output 32 provides one sample per symbol, which sample is timed to be at the symbol maximum as provided by the timing recovery technique of the present invention. The second output 34 provides four samples per symbol, which is advantageous for simplifying the filtering functions implemented by the DSP. The DSP squares the four sample per symbol signal and implements a digital infinite-duration impulse response (IIR) filter to obtain a spectral line or frequency associated with the symbol rate, as discussed in more detail below. The spectral lines signal from the IIR filter is used by the DSP to determine a phase angle offset which is used to calculate an offset time $\tau$. Based on the offset calculated by the DSP, the controller 30 adjusts the A/D converter's sampling time such that the sample provided on the first output 32 is at or near the symbol maximum. The demodulator generates the received digital signal based on the samples on the first output 32. The individual components of the digital section, and variations thereof, are readily available and known to one of skill in the art. Further, although the digital section is shown as implemented using separate components, it alternatively may be implemented using a single processor.

The spectral line associated with the symbol rate is generated, as shown in FIGS. 4A and 4B, by squaring the magnitude of baseband signal samples received from the matched filter. A simple baseband BPSK signal 42 that is based on well randomized data before transmission, which is a requirement for good timing recovery performance using the technique of the invention, will have a periodic square waveform shape with rounded corners 44 (FIG. 4A). A square-wave pulse shape is shown without loss of generality. The rounded corners result from filtering operations done at the transmitter and receiver. After squaring the waveform, little dips 46, which correspond to bit transitions, are created at each rounded corner. Thus, the squared waveform includes a relatively strong fundamental harmonic at the symbol rate and the waveform's maximum points 48 lie in the middle of each bit. Note that in the case of QPSK or $\pi/4$ QPSK type waveforms, each component (I and Q) of the complex baseband samples has characteristics similar to the BPSK waveform and, when individually squared and added together, the two components reinforce each other to create a dip at each symbol transition.

If the origin of time at the receiver is chosen to be the instant at which the first burst sample is received from the matched filter, the optimum timing phase, relative to this origin, is obtained by computing the phase of the fundamental harmonic in units of time and reversing the sign. This computation provides a value for the amount of time necessary to move the first sampling point so that it arrives at a time corresponding to the maximum point 48 on the sinusoidal waveform. The maximum point 48 generally represents the optimum symbol sampling point.

The symbol rate's fundamental harmonic created by the squaring operation is extracted by computing the Discrete Fourier Transform (DFT) of the sampled squared baseband signal at the symbol rate. Assuming that the data burst consists of N symbols, and M samples of the baseband matched filtered signal are taken per symbol interval (a minimum of 2 samples per symbol are necessary to satisfy the Nyquist sampling criteria), the DFT of the resulting signal is:

$$X(k) = \sum_{i=0}^{i=N \cdot M-1} [I(i)^2 + Q(i)^2] e^{-j(2\pi i k/N \cdot M)}, \quad (1)$$

$$k = 0, 1, 2, \ldots, N \cdot M$$

in which I(i), and Q(i) represent samples of the filtered baseband in-phase and quadrature signal components. Evaluating the above expression at the symbol rate which corresponds to k=N, the result is:

$$X(k=N) = \sum_{i=0}^{i=N \cdot M-1} [I(i)^2 + Q(i)^2] e^{-j(2\pi i/M)} \quad (2)$$

The optimum timing phase in units of time is then:

$$\tau = -[\text{angle of } X(k=N)] \cdot T/2\pi \quad (3)$$

in which T denotes the symbol time interval. This value of $\tau$ is then used as the updated symbol sampling instant for the next data burst and so forth.

Choosing the number of samples per symbol to be four, i.e., M=4, the complex exponential $e^{-j(2\pi i/M)}$ reduces to simply $e^{-j\pi i/2}$. Multiplying this factor by the unity value represented as $e^{-j2\pi N}$, and substituting these into equation (2), results in the following:

$$X(k=N) = e^{j2N\pi} \sum_{i=0}^{i=4N-1} [I(i)^2 + Q(i)^2] e^{-j\pi i/2} \quad (4)$$

$$= \sum_{i=0}^{i=4N-1} = [I(i)^2 + Q(i)^2] e^{j(\pi/2)(4N-1)}$$

Define the sequence y(n) as:

$$y(n) = \sum_{i=0}^{i=n-1} [I(i)^2 + Q(i)^2] e^{j(\pi/2)(n-i)} \quad (5)$$

Accordingly, from equations (4) and (5), it follows that:

$$X(k=N)=y(n=4N) \quad (6)$$

Expanding equation (5), provides:

$$y(n)=[I(0)^2+Q(0)^2]e^{j(\pi/2)(n)}+[I(1)^2+Q(1)^2]e^{j(\pi/2)(n-1)}+ \ldots +[I(n-1)^2+Q(n-1)^2]e^{j\pi/2} \quad (7)$$

Similarly, $$y(n-1)=[I(0)^2+Q(0)^2]e^{j\pi/2)(n-1)}+[I(1)^2+Q(1)^2]e^{j\pi/2(n-2)}+ \ldots +[I(n-2)^2+Q(n-2)^2]e^{j\pi/2} \quad (8)$$

From a comparison of (7) and (8), it is seen that:

$$y(n)=e^{j(\pi/2)}y_k(n-1)+[I(n-1)^2+Q(n-1)^2]e^{j\pi/2} \quad (9)$$

Taking the z transform of this difference equation and computing the ratio of the output to the input z transform results in the following system transfer function:

$$H(z)=e^{j\pi/2}z^{-1}/[1-e^{j\pi/2}z^{-1}]=jz^{-1}/[1-jz^{-1}] \quad (10)$$

The system transfer function of equation (10) is implemented by a one pole IIR filter having a flowgraph shown in FIG. 5.

The value of X(k) for k=N, required in equation (3) for computing the timing phase is, as indicated by equation (6), obtained from the output of the filter 50 at time n=4N. More specifically, X(k=N)=y(n=4N).

A flowchart summarizing the technique of the present invention is shown in FIG. 3. The analog baseband signal is digitally sampled at a rate that is an integer multiple of four times the sample rate (block 52). The digitized symbol signal is processed by the DSP 28 which squares the digital signal (block 53) and implements the one-pole filter 50 of FIG. 5 (block 54). The phase offset is measured or calculated (block 56) and converted to offset time units τ. The offset time is used to adjust the A/D converter's sample timing such that a sample occurs at the symbol maxima. These samples are provided to the demodulator for generating the received digital signal (block 60).

Figure 6:
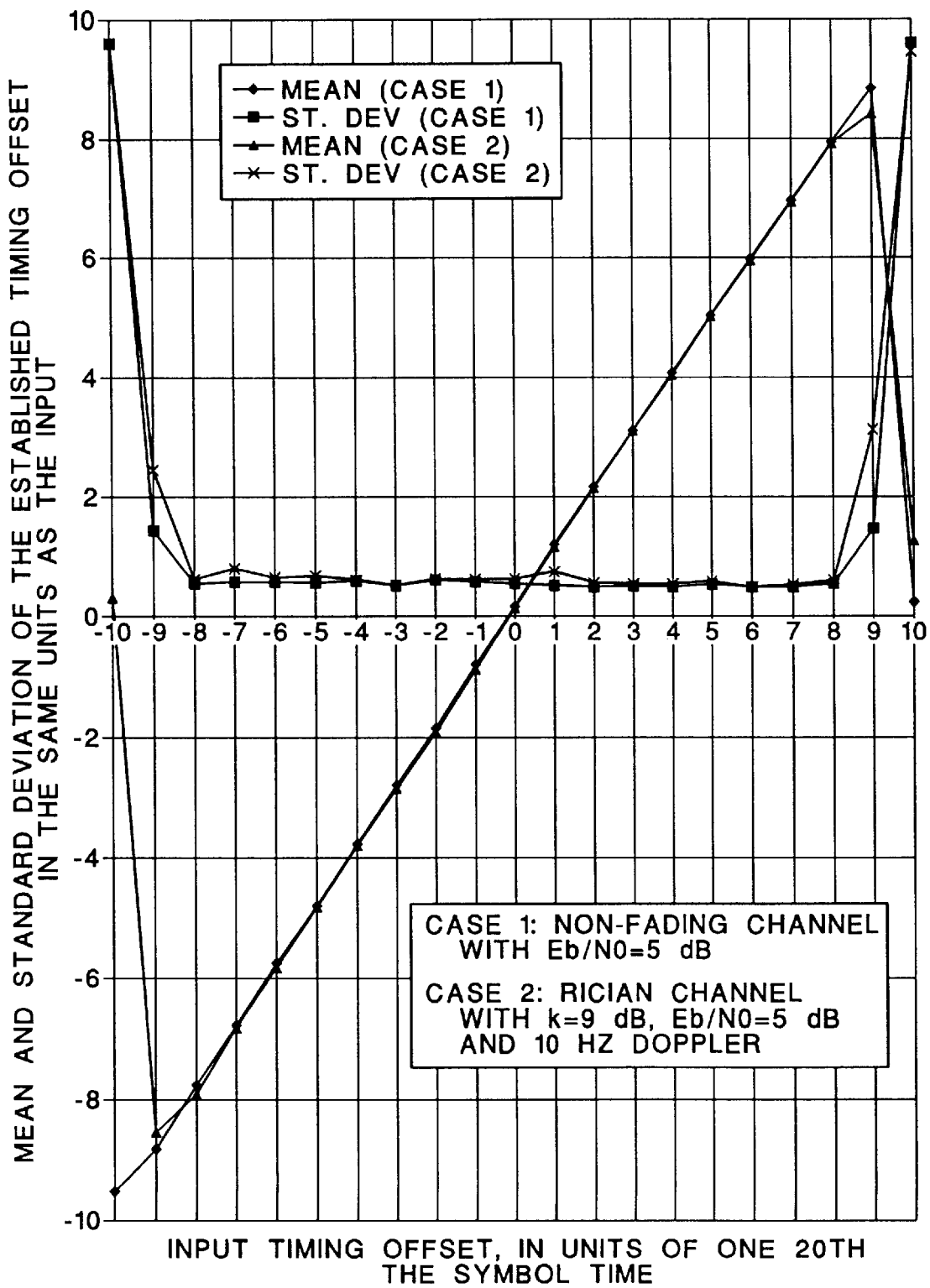
FIG. 6 is a graph of the mean and standard deviation of an estimated timing offset verses input timing offset provided by the timing recovery system based on a first simulated channel condition for evaluating the timing recovery techniques of the present invention.
Figure 7:
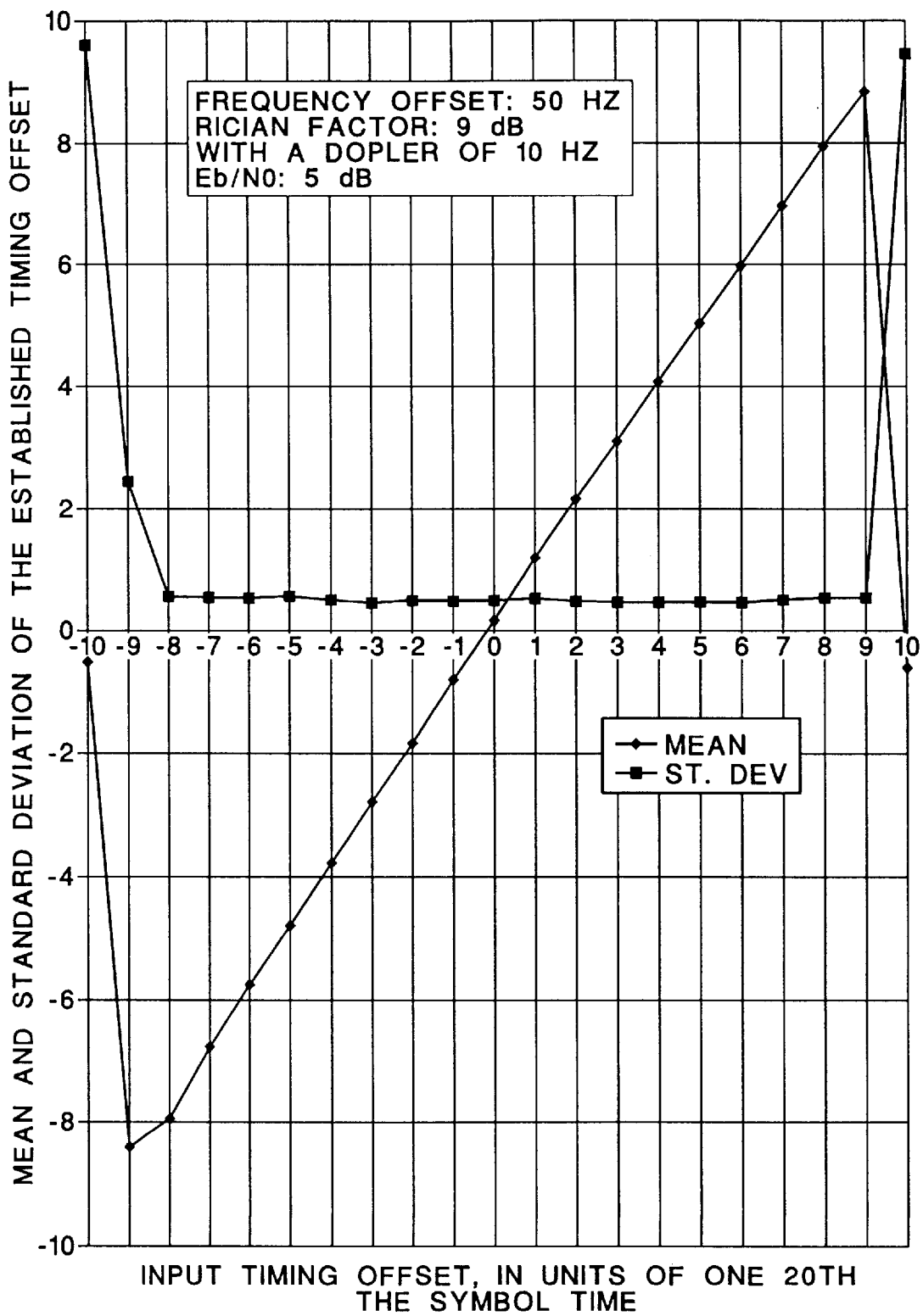
FIG. 7 is a graph of comparison of the mean and standard deviation of an estimated timing offset verses input timing offset provided by the timing recovery system based on differing simulated channel conditions for evaluating the timing recovery techniques of the present invention.

A simulation testbed was used to evaluate the performance of the proposed symbol timing estimation technique of the invention. The simulation testbed used a Rician model with a selectable Rician coefficient to simulate the fade on the satellite channel as shown in FIGS. 6 and 7. The symbol estimation technique was evaluated in both fading and non-fading channels. The non-fading channel was simulated by using a large value for the Rician coefficient. The data was filtered (by simulation) at the transmitter and the receiver using square root raised cosine pulse shaping (in the frequency domain) with a rolloff factor of 0.35. The basic modulation method used was π/4 QPSK. The received signal was sampled at 20 times the symbol rate. This sampling rate allowed the insertion of timing offsets to within ½0th of the symbol time relative to the known optimum sampling instant in the simulation. The symbol rate used in the simulation was 23.4 kilosymbols per second.

The performance of the proposed symbol timing estimation technique was evaluated by computing, based on the known values of the simulation data, the mean and the standard deviation of the estimated timing offsets over 200 bursts, each burst having 108 bytes. This evaluation was performed on both non-fading, and Rician fading channels with a 9 dB Rician factor. The signal-to-noise ratio was set to 5 dB per bit. The input timing offsets to the simulation ranged from −10 to +10 in units of one 20th of the symbol duration. The evaluation results are shown in FIG. 6. The evaluation results shown indicate that excellent performance is achieved over a wide range of the input timing offsets. The simulation was repeated for a signal to noise ratio of 0 dB per bit and good performance was still achieved.

To study the sensitivity of the scheme to frequency offset, the simulation was repeated with a 50 HZ frequency offset introduced into the baseband signal. As shown in FIG. 7, relatively little noticeable performance degradation resulted from the frequency offset. The insensitivity to frequency offset was expected because the frequency offset does not affect the squared magnitude of the baseband signal on which tone filtering is performed by the single pole IIR filter 50.

The timing recovery technique of the invention is well suited for burst-mode digital communications and allows a burst to be processed to extract the timing phase update for a subsequent burst as it is received without buffering. The technique uses a simple one pole IIR filter 50 having a single unity coefficient on the imaginary axis to extract the symbol timing offset. The timing recovery technique is immune to frequency offsets, works at low signal-to-noise ratios, and generally results in excellent robust performance.

While the invention herein disclosed has been described by means of specific embodiments and applications thereof, numerous modifications and variations could be made thereto by those skilled in the art without departing from the scope of the invention set forth in the claims.

I claim:

1. A method for recovering the symbol timing from a baseband signal of digital data symbols having a predetermined data symbol rate, comprising:

sampling the baseband signal at a rate that is at least four times the data symbol rate to generate a digitized signal of at least four signal samples per symbol;

controlling the time at which the baseband signal is sampled such that one of the signal samples per symbol is selected to have a predetermined time relationship with the respective symbol;

squaring the digitized signal to generate a squared signal;

digitally filtering the squared signal to determine a phase error signal; and adjusting the predetermined timing relationship between the selected one of the signal samples and the respective symbol.

2. A method for symbol timing recovery as defined in claim 1, wherein the predetermined timing relationship is selected such that the selected one of the signal samples occurs at a time corresponding to the respective symbol maximum.

3. A method for symbol timing recovery as defined in claim 1, wherein the step of filtering is implemented using the following transfer function:

$$H(z)=jz^{-1}/[1-jz^{-1}]$$

to determine the phase error.

4. A method for symbol timing recovery as defined in claim 1, wherein the sample rate is an integer multiple of four samples per symbol.

5. A method for symbol timing recovery as defined in claim 1, wherein:

the baseband signal comprises a series of digital data bursts; and the predetermined time relationship determined for a particular data burst is applied to an immediately subsequent data burst.

6. A method for symbol timing recovery as defined in claim 5, wherein in each data burst comprises 108 data symbols.

7. A method for determining a symbol timing offset for a series of digital data symbols in a data burst having a predetermined data symbol rate, comprising:

digitally sampling the data symbols at a rate that is an integer multiple of four times the symbol rate to generate a sampled pulse train;

squaring the sampled pulse train to generate a squared pulse train having an enhanced fundamental frequency harmonic which is associated with the symbol rate;

digitally filtering the squared pulse train using a transfer function defined by the equation:

$$H(z)=jz^{-1}/[1-jz^{-1}]$$

to generate a filtered signal;

calculating, using the filtered signal, the phase angle offset between a predetermined time of the symbols and a particular sample associated with the predetermined symbol time to generate a phase offset signal and;

calculating a symbol timing offset based on the phase angle offset signal.

8. Apparatus for recovering the symbol timing from a baseband signal of digital data symbols having a predetermined data symbol rate, comprising:

an analog-to-digital converter having a timing control input responsive to a timing control signal for controlling the time at which the converter samples the baseband signal, the converter sampling the baseband signal at a rate that is at least four times the symbol rate to generate a digitized signal, wherein one of the at least four samples per signal is selected to have a predetermined time relationship with the respective symbol, which predetermined time relationship is controlled by the timing control signal;

a digital signal processor that receives and squares the digitized signal to generate a squared signal, and that digitally filters the squared signal to determine a phase error signal;

a sampling clock phase controller that generates the timing control signal, based on the phase error signal, for adjusting the predetermined time relationship between the selected one of the at least four samples and the respective symbol.

9. Apparatus for symbol timing recovery as defined in claim 8, wherein the predetermined timing relationship is selected such that the selected one of the at least four samples occurs at a time corresponding to the respective symbol maximum.

10. Apparatus for symbol timing recovery as defined in claim 8, wherein the digital symbol processor implements the following transfer function: to determine the phase error.

11. Apparatus for symbol timing recovery as defined in claim 8 wherein:

the symbol rate is about 23.4 kilosymbols per second; and the analog-to-digital converter sample the baseband signal at a sample rate of about 20 samples per symbol.

12. Apparatus for symbol timing recovery as defined in claim 8, wherein:

the baseband signal comprises a series of digital data bursts; and the predetermined time relationship determined for a particular data burst is applied to an immediately subsequent data burst.

13. Apparatus for symbol timing recovery as defined in claim 12, wherein each burst comprises 108 data symbols.

* * * * *